Figure 1:
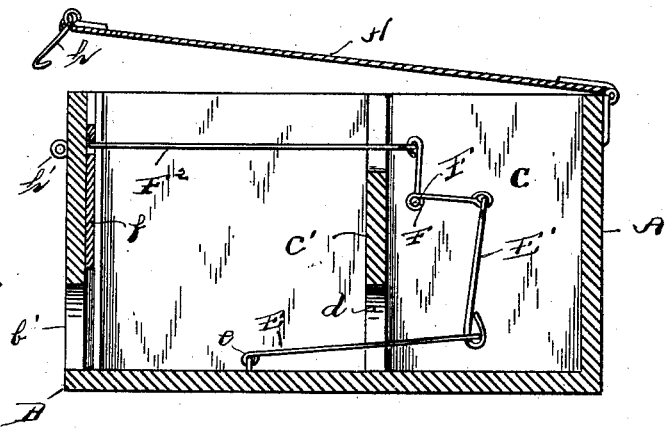

(No Model.)

G. WINKLER.
ANIMAL TRAP.

No. 472,687. Patented Apr. 12, 1892.

Witnesses.

Inventor.
George Winkler
By A. Acker
Atty.

UNITED STATES PATENT OFFICE.

GEORGE WINKLER, OF SAN FRANCISCO, CALIFORNIA.

ANIMAL-TRAP.

SPECIFICATION forming part of Letters Patent No. 472,687, dated April 12, 1892.

Application filed December 14, 1891. Serial No. 414,947. (No model.)

*To all whom it may concern:*

Be it known that I, GEORGE WINKLER, a citizen of the United States, residing at San Francisco, in the county of San Francisco and State of California, have invented certain new and useful Improvements in Animal-Traps; and I do hereby declare the following to be a full, clear, and exact description of said invention, such as will enable others skilled in the art to which it most nearly appertains to make, use, and practice the same.

My invention has relation to certain new and useful improvements in rat-traps, which consists in the arrangement of parts and details of construction, as will be hereinafter more fully set forth in the drawings and described and pointed out in the specification.

The object of my invention is to provide a trap which shall be operated automatically by the weight of the animal while endeavoring to pass into or enter the feed-containing chamber thereof, thus imprisoning or trapping the animal alive, which device shall be simpler in its construction, more effectual in its operation, and more durable than any of a similar nature heretofore known to me.

Figure 2:
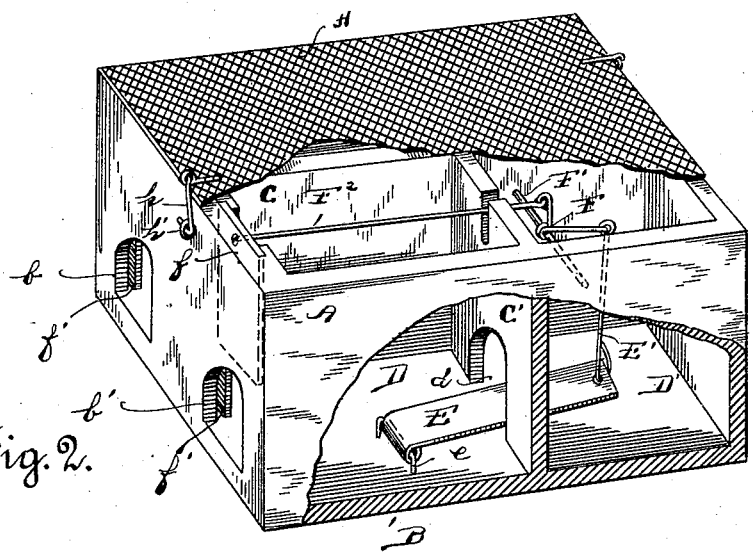

Referring to the drawings forming a part of this specification, wherein similar letters of reference denote corresponding parts throughout the entire specification, Figure 1 is a longitudinal sectional view of the trap, and Fig. 2 is a perspective view partly broken away.

The letter A is used to indicate the trap-frame, preferably rectangular, which is provided with floor or bottom B, and in the present case frame A is divided into two parts by means of partition C, forming separate compartments, access to each of which is gained by means of openings $b\ b'$, which are adapted to be closed by slides, hereinafter described. Each of the compartments is divided by means of cross-partition C', which forms sections D D', the rear one D' of which serves as a feed-retaining chamber. Passage-way $d$ is formed in partition C', which allows of communication between chambers D D' and working of tread-rod E. This tread-rod is secured to floor B within chamber D by means of rod $e$, upon which it works, and extends within chamber D' through passage-way $d$, and the inner end thereof is upheld, so as to cause the same to run at an incline, by means of upwardly-extending rod E', which is connected to one arm of bell-crank lever F, which works on cross supporting-rod F', as shown. The other arm of the bell-crank lever operates slide-rod $F^2$, the outer end of which engages with gravity-slides $f$, which work within guideways $f'$, adapted to close openings $b\ b'$. To the rear upper edge of frame A, I movably secure top or cover H, which is locked by means of catch $h$, fitting within staple $h'$.

The rat, mouse, or other animal in order to pass from chamber D to chamber D', wherein the food is placed, is forced to walk upon inclined tread-rod E, and as the inner end is reached the animal's weight causes the tread-rod to move downward, which, being connected to bell-crank by means of rod E', necessarily rotates some upon cross-rod F' and causes slide-rod $F^2$ to be drawn backward out of engagement with gravity-slides $f$. Immediately upon releasing the slides the same fall by gravity and close openings $b\ b'$, thus effectually preventing the escape of the animal from the trap. It is obvious that any number of sections may be made by increasing the size of the trap.

Having thus described my invention, what I claim as new, and desire to secure protection in by Letters Patent of the United States, is—

1. In an animal-trap, the combination, with the frame thereof, of the tread-rod movably secured to the floor, the bell-crank lever to which the tread-rod is connected, slide-operating rod connected to the bell-crank lever, and the gravity-slides adapted to move downward when the slide-operating rod is moved out of engagement therewith, so as to close the trap-opening and prevent exit of animal, as and for the purpose set forth.

2. In an animal-trap, the combination, with the frame thereof divided into compartments, of the tread-rod movably secured to floor of one compartment and projecting through a passage-way into the other, cross-rod passing through the feed-compartment, and bell-crank lever working on said cross-rod and having one of its arms connected to the free end of the tread-rod, slide-operating rod secured to the other arm thereof, and gravity-slides adapted to be held upward by said rod and when freed to move downward and close the trap-opening, as and for the purpose set forth.

In testimony whereof I affix my signature in presence of two witnesses.

GEORGE WINKLER.

Witnesses:
N. A. ACKER,
J. W. KEYS.